W. S. SEARLES.
SPECTACLE FRAME.
APPLICATION FILED JAN. 9, 1918.
1,306,892.
Patented June 10, 1919.
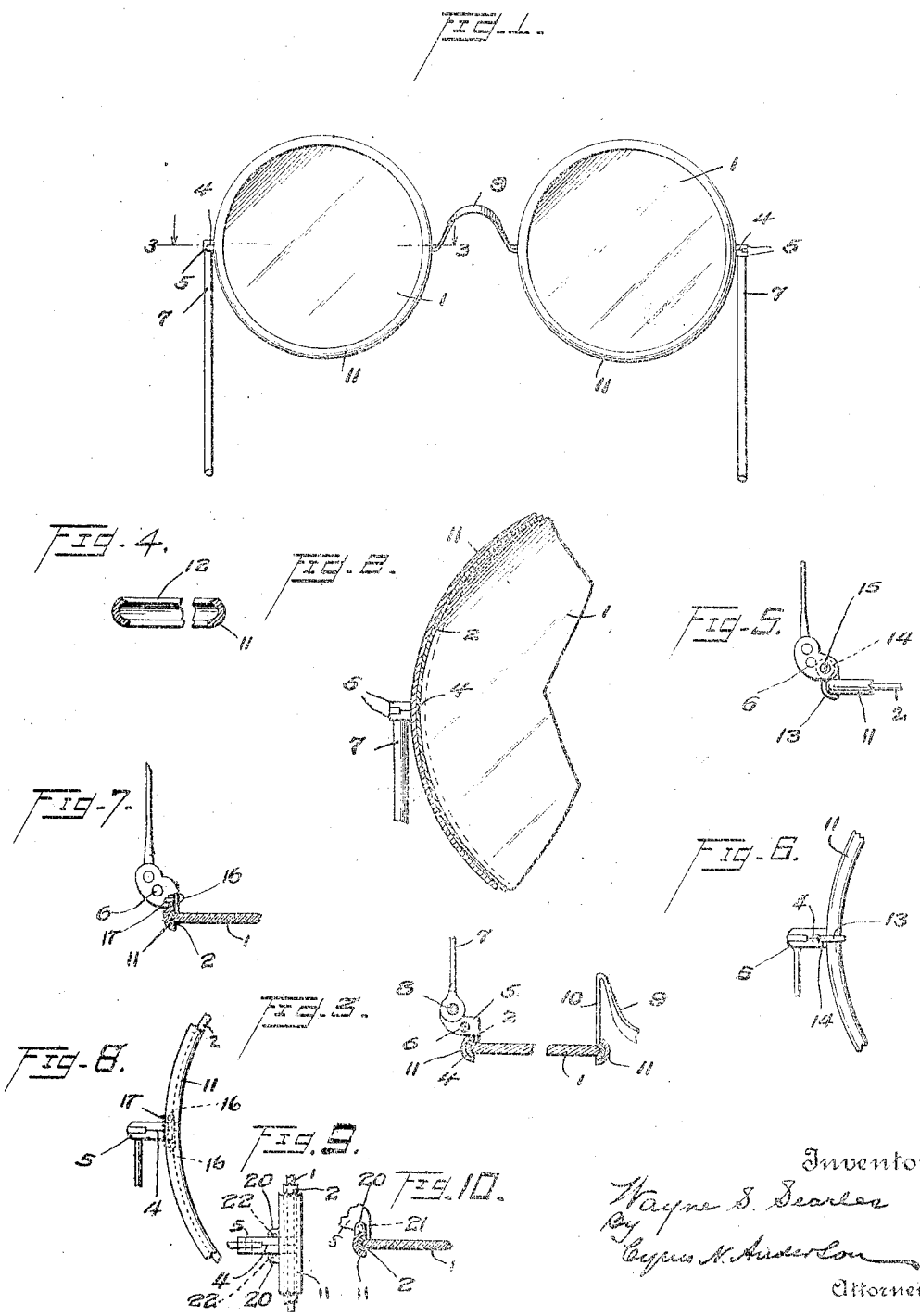

UNITED STATES PATENT OFFICE.

WAYNE S. SEARLES, OF NEWARK, NEW JERSEY, ASSIGNOR TO NEW JERSEY OPTICAL CO., OF NEWARK, NEW JERSEY, A CORPORATION OF NEW JERSEY.

SPECTACLE-FRAME.

1,306,392.

Specification of Letters Patent. Patented June 10, 1919.

Application filed January 9, 1918. Serial No. 210,967.

*To all whom it may concern:*

Be it known that I, WAYNE S. SEARLES, a citizen of the United States, and a resident of Newark, county of Essex, State of New Jersey, have invented certain new and useful Improvements in Spectacle-Frames, of which the following is a specification.

My invention relates to frames for eyeglasses or spectacles in which the rims for holding the lenses consist of a combination of metal and non-metal rims, the latter encircling the former.

One of the objects of my invention is to simplify the construction of such rims and also thereby effect a cheapening in the cost of manufacture.

A further object of my invention is to provide a construction in which, while the metal rim portions may be split, as is quite the general practice, to permit of the insertion of the lenses within the said metal rim parts, the non-metallic encircling portion is continuous or endless and unbroken.

Another object of my invention is to provide a construction of combined metal and non-metal rim in which the metal rim part is so arranged with respect to other parts of the spectacle or eyeglass frames that the continuous or endless non-metallic rim parts may be readily placed in position encircling or about the said metallic rim parts.

It is also a further object of my invention to provide means whereby, if desired, the non-metallic rim may be easily secured and held in position upon the metallic frame so as to prevent accidental removal of the same therefrom.

In order that my invention may be more readily understood and its practical advantages more readily comprehended and appreciated reference should be had to the accompanying drawing in which I have illustrated one embodiment of a convenient form of my invention.

In the said drawing:—

Figure 1 is a view in front elevation of a pair of spectacles in which the rims are constructed in accordance with my invention;

Fig. 2 is a view showing in central longitudinal section a portion of a rim at one end of the spectacle frame;

Fig. 3 is a transverse sectional view taken on the line 3—3 of Fig. 1;

Fig. 4 is a view of the inside of a portion of a non-metallic rim showing a slightly modified construction thereof;

Fig. 5 is a perspective view of one end portion of a pair of spectacles showing means for positively securing and holding the non-metallic outer rim in place upon the metallic rim;

Fig. 6 is a view in front elevation of the portion of structure shown in Fig. 5;

Fig. 7 is a transverse sectional view of one end portion of a pair of spectacles showing the temple lugs and another modified construction of means for holding the non-metallic rim in place upon the metallic rim;

Fig. 8 is a front view of one end portion of a spectacle frame of the construction shown in Fig. 7;

Fig. 9 is a view in end elevation of a pair of spectacles showing still another modification of means for holding the non-metallic rim in position upon the metallic rim; and Fig. 10 is a transverse sectional view of one end portion of a pair of spectacles showing a different view of the holding means shown in Fig. 9.

Referring to the drawing, 1 designates the lenses of a pair of spectacles and 2 are the metallic rim parts which are in contact with and hold the edges of the lenses 1.

The said metallic rim part is split, as indicated at 4, and to the ends thereof adjacent the said split part the temple connecting lugs or projections 5 are secured.

The forward edges or ends of these lugs are connected to the rear edge of the metallic rim part 2, as is clearly shown in Fig. 3 of the drawing. These connecting lugs or projections are fastened together by means of the threaded screw 6,—such fastening operating to clamp and hold the metallic rim parts 2 around the lenses 1. The forward ends of the temple wires 7 are connected in known manner to the connecting lugs or projections 5 by means of the pivot screws 8.

The bridge 9 is provided with the forwardly projecting arm portions 10 which also are secured to the rear edges of the metallic rim parts 2, as clearly shown in Fig. 3 of the drawing. 11 designates the non-metallic rim parts which encircle or extend around the outer peripheral surface portion of the metallic rim parts 2.

It will be seen that by connecting the forward edges or end portions of the lugs or projections 5 and the forward ends of the projecting arms 10 to the rear edges of the metallic rim parts 2 the outer peripheral surfaces of the latter are left free and uninterrupted so that the non-metallic rim parts 11 may be placed on and removed from the said metallic rim parts 2. This can be easily and quickly done.

By thus providing a construction in which the non-metallic rim parts 11 are continuous or endless and unsplit I avoid the necessity of providing special means for connecting and securing the non-metallic rim parts 11 to the metal rim parts 2.

In Fig. 4 I have shown a portion of non-metallic rim which is of slightly modified construction in that the outer corner of one edge thereof is cut away so as to form a beveled or inclined surface 12. By cutting away the corner and providing such beveled surface 12 I have found that the continuous, endless non-metallic rim may be more easily and readily placed in position upon the metallic rim than when such corner is not cut away.

Although not essential to the broad idea of my invention I have shown in subsequent figures of the drawing means for engaging and holding the continuous, endless, non-metallic rims in position upon the metallic rims so as to prevent accidental disengagement of said rims.

In Figs. 5 and 6 I have shown a construction in which the non-metallic encircling rim is continuous and is endless and in order to prevent the accidental disengagement of such non-metallic rims with the metallic rims I have provided means for positively holding and securing such non-metallic rims upon the metallic rims. The means provided in the form of construction illustrated in Figs. 5 and 6 consists of a finger 13 having an enlarged portion 14 seated in a cavity formed between the split temple lugs 4. If preferred a screw 15 may extend through the temple lugs or projections 4 and through the enlarged end 14 of the finger 13, although this is not essential. After the non-metallic rim 11 is placed in position upon the metallic rim 2 the finger 13 is bent down into the position shown in Figs. 5 and 6 over the said non-metallic rim in which position it will operate to hold the latter against accidental removal from the metallic rim.

In Figs. 7 and 8 the construction provided for the same purpose as the finger 13 consists of a couple of projections 16 extending rearwardly from one edge of a non-metallic rim 11. These projections, when the rim 11 is placed in position upon the metallic rim, are situated upon opposite sides of the temple lugs or connections 4, as is clearly indicated in Fig. 8 of the drawing. By thus positioning the projection 16 a rim 11 is prevented from creeping around upon a metallic rim 2 even though the latter might be circular.

17 designates a wire which extends through the temple lugs or connections 4. Its opposite ends are bent down over the projections 16, such bent down edges fitting in shallow grooves or depressions in the outer sides of the said projections so as to prevent the accidental removal of the non-metallic rim 11 from the metallic rim.

In Figs. 9 and 10 is shown still another modified construction of means for holding and securing the non-metallic rim 11 in place upon the metallic rim 2. In the constructions shown in these figures the non-metallic rim is provided with projections 20 extending rearwardly from the rear edge of the rim 11. The projections 20 are situated upon opposite sides of the temple lugs or projections 4, as is the case with the projections 16.

The projections 20 are each provided with depressions 21, indicated by dotted lines, which depressions are adapted to engage with small projections 22 upon the outer sides of the temple lugs or connections 4. When the projections 22 upon the outer sides of the temple lugs or connections 4 are in engagement with the depressions 21 in the inner sides of the projections 20 it is obvious that the non-metallic rim 11 is not liable to become accidentally detached or removed from the metallic rim 2.

I claim:—

1. As an article of manufacture, a spectacle or eyeglass frame comprising rims consisting of inner metallic rim parts for engaging and holding the edges of the lenses and non-metallic continuous or endless rim parts which encircle the said metallic rim parts and fingers for engaging the said non-metallic rim parts to hold the same in position upon the metallic rim parts.

2. As an article of manufacture, a spectacle or eyeglass frame comprising metallic rim parts adapted to engage and hold the edges of the lenses, said rim parts respectively being split transversely, a bridge having connection at its opposite ends to the rear edges of the said metallic rim parts, temple lugs or projections connected to the rear edges of the said metallic rim parts at the adjacent opposing ends thereof, and fingers having connection with said temple lugs and extending over the said non-metallic rims to hold the same in position upon the metallic rims.

In testimony that I claim the foregoing as my invention, I have hereunto signed my name this 4th day of January, A. D. 1918.

WAYNE S. SEARLES.

Witness:
AUGUST ROEMMELE.